United States Patent
Rentrop et al.

(10) Patent No.: US 10,741,312 B2
(45) Date of Patent: Aug. 11, 2020

(54) PRINTED TEMPERATURE SENSOR

(71) Applicant: Nederlandse Organisatie voor toegepast-natuurwetenschappelijk onderzoek TNO, s-Gravenhage (NL)

(72) Inventors: Cornelis Hermanus Arnoldus Rentrop, Eindhoven (NL); Jorgen Sweelssen, Mierlo (NL); Milan Saalmink, Velhoven (NL); Edsger Constant Pieter Smits, Eindhoven (NL); Wilhelm Albert Groen, Eindhoven (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/491,494

(22) PCT Filed: Mar. 5, 2018

(86) PCT No.: PCT/NL2018/050134
§ 371 (c)(1),
(2) Date: Sep. 5, 2019

(87) PCT Pub. No.: WO2018/164570
PCT Pub. Date: Sep. 13, 2018

(65) Prior Publication Data
US 2020/0020467 A1    Jan. 16, 2020

(30) Foreign Application Priority Data
Mar. 6, 2017   (EP) ..................................... 17159343

(51) Int. Cl.
*H01C 7/04*    (2006.01)
*G01K 7/16*    (2006.01)
(Continued)

(52) U.S. Cl.
CPC ............... *H01C 7/043* (2013.01); *G01K 7/16* (2013.01); *H01C 1/01* (2013.01); *H01C 7/049* (2013.01);
(Continued)

(58) Field of Classification Search
CPC .. H01C 7/043; H01C 7/049; H01C 17/06533; H01C 17/06586; G01K 7/16
See application file for complete search history.

(56) References Cited

U.S. PATENT DOCUMENTS 4,961,999 A * 10/1990 Hormadaly ............... C03C 8/14
                                                         428/427
5,639,556 A *  6/1997 Gaumet ..................... H01B 1/22
                                                         252/510

(Continued)

FOREIGN PATENT DOCUMENTS

DE      10150248 A1    6/2002
EP       2866118 A1    4/2015
(Continued)

OTHER PUBLICATIONS

K. Park et al., "Mn—Ni—Co—Cu—Zn—O NTC Thermistors with High Thermal Stability for Low Resistance Applications," Scripta Materialia, vol. 57, Issue 4, pp. 329-332 (2007) http://www.sciencedirect.com/science/article/pii/S1359646207003119.

(Continued)

*Primary Examiner* — Kyung S Lee
(74) *Attorney, Agent, or Firm* — Leydig, Voit & Mayer, Ltd.

(57) ABSTRACT

A printed temperature sensor (10) comprising a substrate (1) with an electrical circuit (2) comprising a pair of electrodes (2a, 2b) separated by an electrode gap (G). A sensor material (3) is disposed between the electrodes (2a, 2b) to fill the electrode gap (G), wherein the sensor material (3) comprises (Continued)

semi-conducting micro-particles (3p) comprising an NTC material with a negative temperature coefficient (NTC), wherein the micro-particles (3p) are mixed in a dielectric matrix (3m) functioning as a binder for printing the sensor material (3); wherein the micro-particles (3p) contact each other to form an interconnected network through the dielectric matrix (3m), wherein the interconnected network of micro-particles (3p) acts as a conductive pathway with negative temperature coefficient between the electrodes (2a, 2b).

15 Claims, 8 Drawing Sheets

(51) Int. Cl.
    *H01C 1/01*      (2006.01)
    *H01C 17/065*    (2006.01)
(52) U.S. Cl.
    CPC . *H01C 17/06533* (2013.01); *H01C 17/06586* (2013.01)

(56) References Cited

U.S. PATENT DOCUMENTS

| 5,980,785 | A  |   | 11/1999 | Xi et al. |
| 6,114,413 | A  | * | 9/2000  | Kang ..................... C08K 9/02 523/205 |
| 7,049,929 | B1 | * | 5/2006  | Fjelstad ................. H01C 7/005 338/252 |
| 8,840,700 | B2 | * | 9/2014  | Shearer ..................... B22F 3/10 75/255 |
| 9,341,521 | B2 | * | 5/2016  | Kloiber .................. G01K 7/223 |
| 2002/0074657 | A1 | * | 6/2002 | Nakayama ............. B32B 18/00 257/747 |
| 2008/0009578 | A1 |   | 1/2008 | Khatua et al. |
| 2008/0023665 | A1 | * | 1/2008 | Weiser ................ H01L 23/3733 252/71 |
| 2009/0165289 | A1 |   | 7/2009 | Deng et al. |

FOREIGN PATENT DOCUMENTS

| JP | H08-124716 A | 5/1996 |
| JP | H08-273904 A | 10/1996 |
| JP | H10-154603 A | 6/1998 |
| WO | WO 2012/035494 A1 | 3/2012 |

OTHER PUBLICATIONS

Schmidt et al., "Electrical Properties of Screen-Printed NiMn$_2$O$_{4+}$," Journal of European Ceramic Society, vol. 25, No 12, pp. 3027-3031, XP004934411 (Apr. 5, 2005).

Murugaraj et al., "Thermistor Behaviour in a Semiconducting Polymer-Nanoparticle Composite Film," Journal of Physics D: Applied Physics, No. 39, pp. 2072-2078, XP020094461 (May 21, 2006).

European Patent Office, International Search Report in corresponding International Application No. PCT/NL2018/050134 dated Jun. 1, 2018 (3 pages ).

* cited by examiner

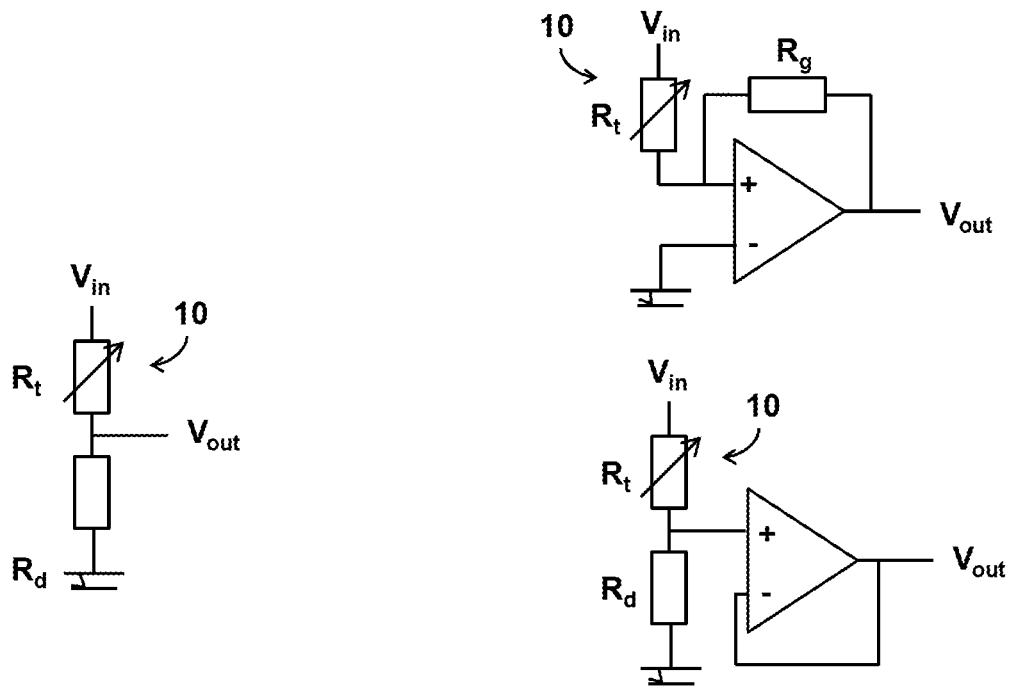
FIG 5A
FIG 5B
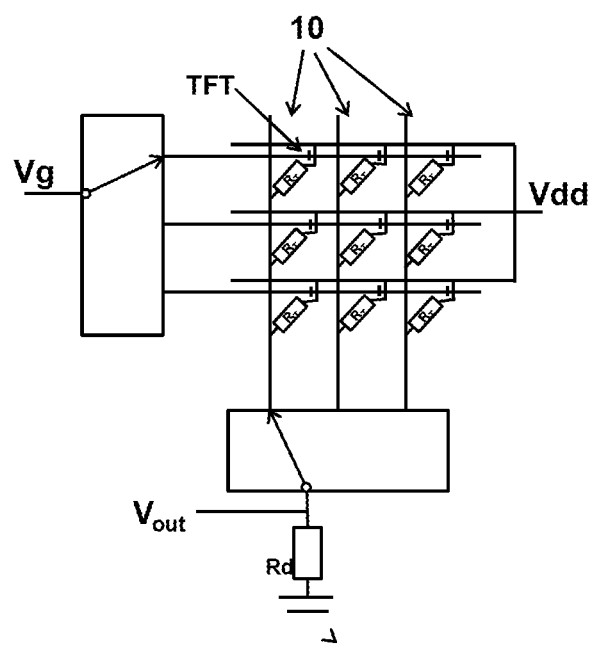
FIG 5C
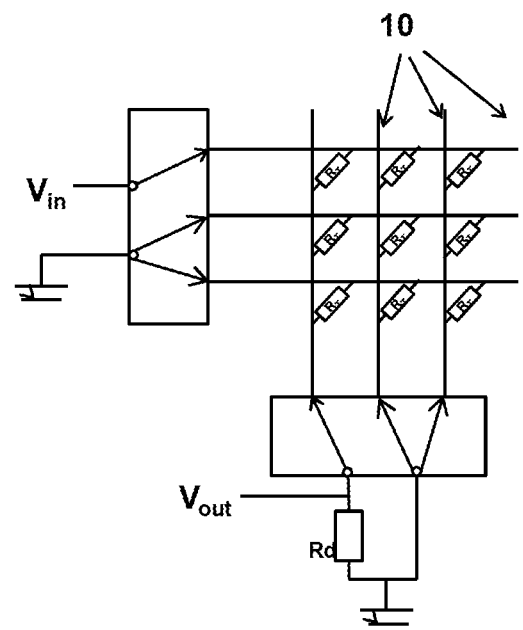
FIG 5D

PRINTED TEMPERATURE SENSOR

CROSS-REFERENCE TO RELATED APPLICATIONS

This patent application is a U.S. National Phase of PCT International Application No. PCT/NL2018/050134, filed Mar. 5, 2018, which claims priority to European Application No. 17159343.7, filed Mar. 6, 2017, which are both expressly incorporated by reference in their entireties, including any references contained therein.

TECHNICAL FIELD AND BACKGROUND

The present disclosure relates to a printed temperature sensor based on a resistor with negative temperature coefficient (NTC).

A thermistor is a type of resistor whose resistance has a particular dependence on temperature. When the dependence is known, the resistance can be used as a measure for the temperature. Temperature sensing circuits commonly use a thermistor of the NTC type where its resistance decreases as temperature rises since they provide a sufficiently linear dependence of resistance with temperature. NTC materials used for such thermistor typically comprises a ceramic material. However such materials require special ceramic substrates (alumina, quartz) that can withstand the sintering processes at more than thousand degrees Celsius. Making a ceramic based NTC suitable for low temperature processing is difficult without negatively affecting its thermo-electrical properties. In general, current high reliability thermistors require high temperature processing which makes it unsuitable for printing on widespread substrates in electronics, e.g. plastics such as PEN/PET, rubbers such as silicones or polyurethanes, composites boards such as FR4, high temperature foils e.g. polyimide or glass.

It is thus desired to provide a printable temperature sensor with reliable thermo-electrical properties which can be directly applied to (flexible) substrates under temperature conditions compatible with common industrial and printed electronics substrates.

SUMMARY

Accordingly, the present disclosure provides a temperature sensor which may be printed on a substrate. The temperature sensor comprises an electrical circuit. The electrical circuit comprises a pair of electrodes. The electrodes are separated by an electrode gap. A sensor material is disposed between the electrodes thus filling the electrode gap. The sensor material comprises semi-conducting micro-particles. The micro-particles comprise of a material with a strong NTC behavior. The micro-particles are mixed in a dielectric matrix which is non-conducting. The dielectric matrix may function as a binder e.g. to make it suitable for printing the sensor material and provide mechanical stability of the film after curing. Advantageously the micro-particles may be individual (unmerged) but contacting each other to form an interconnected network through the dielectric matrix. The interconnected network of micro-particles acts as a conductive pathway with negative temperature coefficient between the electrodes.

By mixing the NTC material as micro-particles in a suitable dielectric matrix, the material becomes printable. The ceramic micro-particles may be processed at high temperature before forming an ink or paste by mixing with the matrix. The dielectric matrix may be mixed with a solvent that is evaporated after application of the material at low temperatures. By mixing the micro-particles such that they contact each other after application to form an interconnected network in the sensor material, it is found that the thermo-electric properties of the NTC material can be retained without the need to merge the particles by melting or sintering. Accordingly, a printable temperature sensor is provided with reliable thermo-electrical properties which can be applied e.g. to conventional substrates under low temperature conditions.

By providing the volumetric ratio of the micro-particles with respect to the dielectric matrix well above a percolation threshold, it may be ensured that the micro-particles form a connected component throughout the dielectric matrix on the order of a size of the electrode gap. This may typically be achieved by providing the micro-particles with a relatively high packing density, e.g. more than 0.5 (fifty percent), preferably more than 0.7. The minimum desired ratio can also be measured experimentally from the conductivity or resistance behavior of the sensor material. For example, the ratio of the micro-particles with respect to the dielectric matrix is preferably sufficiently high to have a conductivity of the sensor material approach that of the pure NTC material, e.g. within fifty percent having practically the same conductivity as the pure NTC material. For typical materials this may correspond to a mass ratio of the micro-particles with respect to the dielectric matrix of more than three to one.

Preferably, the conductive properties of the sensor material are primarily governed by the strongly thermally activated electronic properties of NTC material of the micro-particles rather than the tunneling or hopping between neighboring micro-particles. Thereto, the number of micro-particle to micro-particle hopping is preferably kept low enough to have minimal impact on the bulk conductivity properties of the NTC material in the micro-particles, e.g. less than ten percent, preferably less than five percent impact on the conductivity, or even practically no impact. For example a number of grain-to-grain hops to cross the gap may be preferably be on average between five and twenty, or less.

By using a relatively narrow gap with NTC material between the electrodes, the number of micro-particles forming the conductive path may be limited. Accordingly, the (minimum) distance of the electrode gap is preferably set in a range between one and ten times an average diameter of the micro-particles. Typically, the micro-particles have an average diameter between one and hundred micrometer, preferably between ten and fifty micrometer. Accordingly, the minimum distance of the electrode gap may be selected e.g. in a range between ten and thousand micrometer, preferably between twenty and two hundred micrometer.

By forming a pacification layer around an NTC material of its core the micro-particles may become more inert (less reactive) to the environment, e.g. moisture. But to achieve sufficient conduction between contacting micro-particles, it is found desirable that the NTC material is separated by a distance of no more than five nanometer, preferably less than three nanometer. Accordingly, the pacification layer is preferably very thin, e.g. less than two nanometers. Such thin layer may essentially consist of a single layer of molecules and can be achieved for example by a self-assembled monolayer graphed to an outer surface of the particle core.

An advantageous NTC material for the combination with the present methods is found in the semi conducting ceramics (metal oxides) in particular those with spinel oxide structure such as $NiMn_2O_4$, $CuFe_2O_4$, $CoMn_2O_4$, $Fe_2O_3$.

Particularly suitable may be micro-particles comprising a manganese spinel oxide. Optionally additional oxide of other elements may be included such as Cu, Fe, Co, Ni, Zn. For example manganese spinel oxide may be produced by homogenous distribution of a metal oxide precursor powder that is pressed into a pallet and calcinated, preferably above thousand degrees Celsius, e.g. 1100 degrees Celsius. The calcinated pallets may be grinded and sieved into micro-particles of a particular size, e.g. with a size ranging between ten and fifty, preferably between ten and twenty micrometers.

To allow some bending and/or stretching of the sensor substrate, the sensor material preferably has a relatively low thickness, e.g. between fifteen and hundred micrometer. The lay of sensor material may be applied through printing. For example, the sensor material may be applied using stencil printing, e.g. wherein a stencil thickness is set between 25-300 micrometers, preferably hundred to hundred-fifty micrometers. For example, the sensor material is applied using screen printing. e.g. wherein a screen with a mesh of mesh size less than two hundred micrometers is used.

By providing the dielectric matrix an electrically insulating material, it may be ensured that conduction essentially only takes place via the NTC material of the micro-particles. For example the dielectric matrix may comprise polymeric or cross-linkable material. By using a material of the dielectric matrix having a neutral pH (potential of Hydrogen, Acidity), the matrix is typically charged neutral ensuring the micro-particles are not deteriorated by the matrix acidity. By using material for the dielectric matrix with a low affinity for humidity, e.g. dense and/or hydrophobic material, environmental effects on the conduction behavior may be avoided. For example the dielectric matrix may form a dense structure after crosslinking, e.g. allowing a maximum water uptake of less than half (mass) percent, preferably below a tenth of a percent. For example, the dielectric matrix comprises a precursor with an acrylate, epoxy, isoprene or benzocyclobutene moiety. For example, the dielectric matrix comprises a dielectric polymer such as polyurethane ether, polyisoprene, cellulose nitrate.

The electrodes are typically made of metal and may be deposited e.g. via sputtering of metals such as Al, Mo, Ag, Au, Cu. Preferably though, the electrodes are also printed, e.g. made from a silver paste or ink, or copper. For example the electrodes may have a layer thickness in a range between 0.1 to 10 µm. By forming an interdigitated finger electrode (driver) the electrode gap can relatively long transverse to the gap distance, e.g. at least ten times a minimum gap distance. This may lower the overall resistance of the sensor, which is preferably in a range between 10 kΩ and 10 MΩ. For example a film of sensor material may be formed between the electrode fingers with a cross-sectional area larger than 0.01 mm$^2$. For example, the cross-sectional area is as a product of the width and height of the film. Optionally, a resistance of the sensor layer can trimmed, e.g. by a laser to match a predetermined value within some percentage, e.g. 10%.

Optionally the ceramic particles may be shaped during sintering into filaments. In this way, filaments or nanowires can be created with high aspect ratio enabling high conductivity in the direction of the filaments.

Various types of substrates may be used. For example the substrate may comprises or essentially consists of a ceramic, polymer or composite. For example, the substrate may comprises a ceramic consisting of a glass ($SiO_2$), silicon, alumina. Alternatively, the substrate comprises a printed circuit board (PCB), such as a fiber glass reinforced epoxide board, laminate type of PCB. Alternatively, the substrate comprises plastic such Polystyrene, Polyethylene terephthalate (PET), Polyethylene naphthalate (PEN), Polyimide (PI), Polycarbonate, Poly(methyl methacrylate) (PMMA).

Preferably, the substrate comprises a flexible and/or stretchable foil, e.g. having a thickness between twenty-five and two hundred micrometers. In some embodiments, the substrate with the sensor is flexible, e.g. allowing a bending radius of less than five millimeters without losing essential functionality. In other or further embodiments, the substrate with the sensor is stretchable, e.g. allowing an elongation of a least ten percent without losing essential functionality. For example, the substrate comprises a rubber substrate, e.g. with thermal polyurethane or a silicone. For example, the matrix comprises a rubber material with electrodes comprising a stretchable silver paste.

BRIEF DESCRIPTION OF DRAWINGS

These and other features, aspects, and advantages of the apparatus, systems and methods of the present disclosure will become better understood from the following description, appended claims, and accompanying drawing wherein:

FIGS. 5A-5D schematically illustrate various circuit diagrams involving one or more sensors;

DESCRIPTION OF EMBODIMENTS

Figure 1:
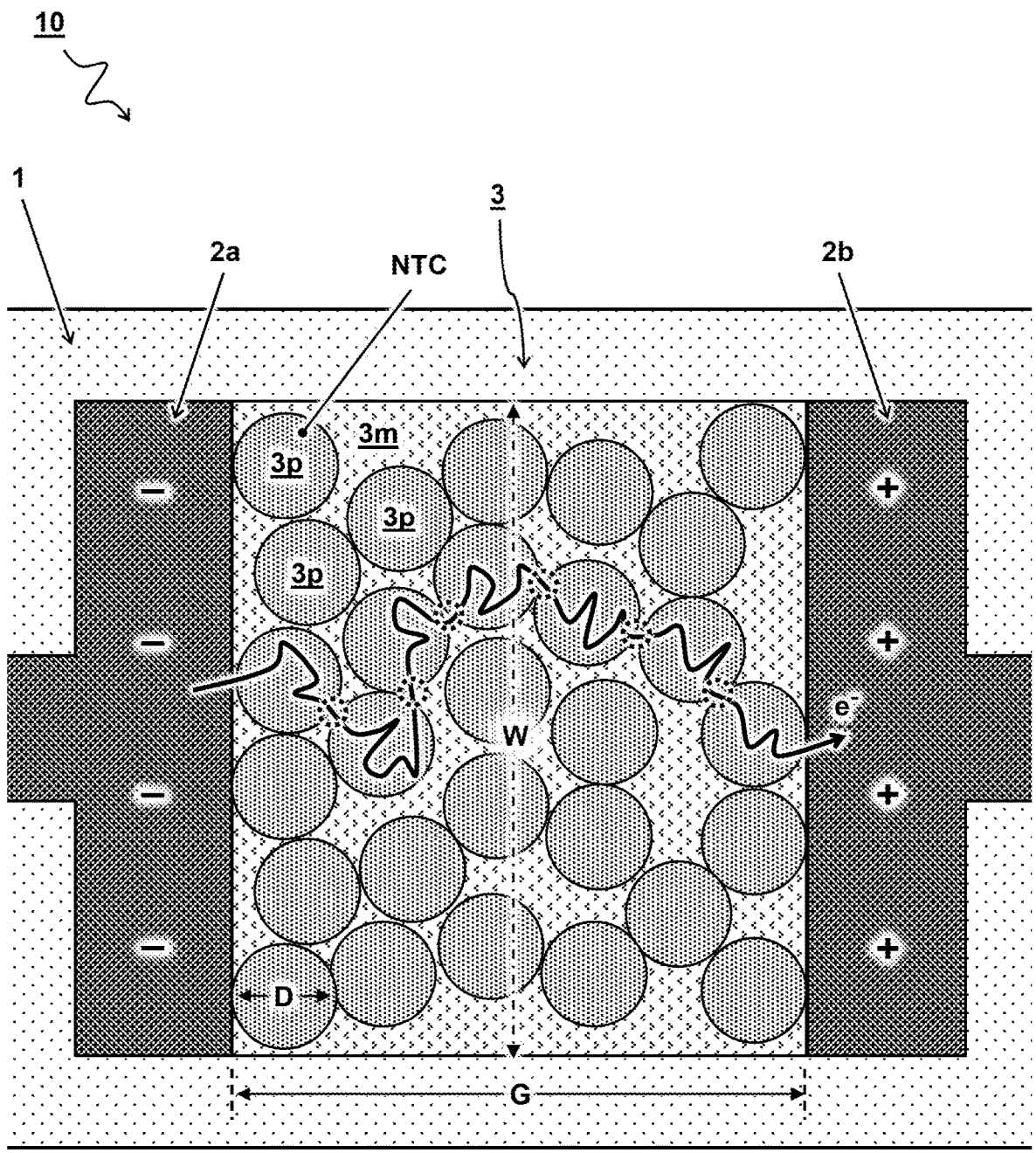
FIG. 1 schematically illustrates a top view of an embodiment of a sensor.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 schematically illustrates a top view of an embodiment of a sensor 10, e.g. for measuring temperature.

In one embodiment, the sensor 10 comprise or is formed on a substrate 1. An electrical circuit 2 is e.g. deposited on the substrate 1. The electrical circuit 2 comprises a pair of electrodes 2a,2b separated by an electrode gap G. A sensor material 3 is disposed between the electrodes 2a,2b to fill the electrode gap G. As described herein, the sensor material 3 preferably comprises semi-conducting micro-particles 3p comprising an NTC material, i.e. having a negative temperature coefficient of resistance. The micro-particles 3p are mixed in a non-conducting dielectric matrix 3m. The electrically insulating matrix 3m may function as a binder. As shown the individual micro-particles 3p contact each other to form an interconnected network through the dielectric matrix 3m. Of course the present illustration is two-dimensional while in reality a three dimensional network may be formed. The interconnected network of micro-particles 3p may to form conductive pathways with negative temperature coefficient between the electrodes 2a,2b. The present illustration schematically shows one possible path, while there may be many more paths. It will be appreciated that the present disclosure may provide a network of individual or separate (unmerged) micro-particles which may be at close relative distance from each other and/or contacting each other, without needing to be merged together to form single piece of (NTC) material, i.e. without the need for high temperature processing to sinter or melt the micro particles together.

In one embodiment, the volumetric ratio of the micro-particles 3p with respect to the dielectric matrix 3m is well above a percolation threshold of the micro-particles 3p to form a connected component throughout the dielectric matrix 3m on the order of a size of the electrode gap G. The percolation threshold may be considered as a mathematical concept related to percolation theory, which is the formation of long-range connectivity in random systems. Above the threshold a giant connected component typically exists of the order of system size.

In some embodiments, a packing density of the micro-particles 3p in the sensor material 3 is more than 0.5, preferably more than 0.6, or even more than 0.7. Preferably the ratio of the micro-particles 3p with respect to the dielectric matrix 3m is sufficiently high to have a conductivity of the sensor material 3 approach that of the NTC material as such, e.g. within fifty percent or even having practically the same conductivity as the pure NTC material. In another or further embodiment, a mass ratio of the micro-particles 3p with respect to the dielectric matrix 3m is more than two to one, preferably more than three to one.

In one embodiment, the minimum distance of the electrode gap G (indicated by the arrow) is in a range between one and ten times an average or maximum diameter D of the micro-particles. Of course, while the present particles are depicted as balls, in general various shapes can be present. For example, the minimum distance of the electrode gap G is selected in a range between ten and thousand micrometer, preferably between twenty and two hundred micrometer. For example, the micro-particles 3p have a diameter D between one and hundred micrometer, preferably between ten and fifty micrometer. In one embodiment, the ceramic particles are grown in the form of rods or wires with a diameter in the order 0.1 to 10 µm and a length of 10 to 250 µm. By doing so for long electrode gaps (G) a single wire can bridge the gap.

It is preferable that the conductive properties of the sensor material 3 are primarily governed by charge transport through the NTC material of the micro-particles rather than tunneling or hopping between neighboring micro-particles. Accordingly, the distance between the micro-particles 3p or at least the NTC material is preferably low. In one embodiment, the material 3c with negative temperature coefficient NTC in the contacting micro-particles 3p is separated by a distance Dcc of less than five nanometer preferably less than three nanometer. In another or further embodiment, the number of micro-particle to micro-particle hopping is sufficiently low to have minimal impact on the bulk conductivity properties of the NTC material in the micro-particles, e.g. less than ten percent, preferably less than five percent impact on the conductivity, or even no discernable impact. For example a number of hops to cross the gap may be on average between five and twenty, or less.

In the embodiment shown, the electrodes 2a,2b and sensor material 3 are deposited on the substrate 1. In particular the sensor material 3 is deposited between the electrodes 2a,2b. Accordingly, a distance of the electrode gap G may be determined by a cross-section dimension of the sensor material 3 along the substrate 1.

In one embodiment, the sensor material has a dry layer thickness between fifteen and hundred micrometer, e.g. applied through printing For example, the sensor material is applied using stencil printing, e.g. wherein a stencil thickness is set between 25-300 micrometers, preferably 100-150 micrometers. For example, the sensor material 3 is applied using screen printing. e.g. wherein a screen with a mesh of mesh size less than 200 micrometers is used.

In one embodiment, the electrodes are made of metal, e.g. deposited via sputtering of metals such as Al, Mo, Ag, Au, Cu. In another or further embodiment, the electrodes 2a are printed, e.g. made from a metal such as Ag, Cu. For example, the electrodes have a layer thickness in a range between 0.1 to 10 µm. In one embodiment, wherein a film formed by the sensor material has a cross-sectional area larger than 0.01 mm². For example, the cross-sectional area is as a product of the width and height of the film. Preferably, a resistance of the sensor is in a range between 10 kΩ and 10 MΩ. Optionally, the resistance of the sensor layer is trimmed by a laser to match a predetermined value within 10%.

In one embodiment, the dielectric matrix 3m comprises an electrically insulating material, e.g. a polymeric or cross-linkable material. In another or further embodiment, the material of the dielectric matrix 3m has a neutral pH. In some embodiments, the material of the dielectric matrix has a low affinity for humidity, e.g. dense and/or hydrophobic material, e.g. allowing a maximum water uptake of less than half (mass) percent, preferably below a tenth of a percent, e.g. allowing a maximum water uptake of less than half (mass) percent, preferably below a tenth of a percent, e.g. allowing a maximum water uptake of less than half (mass) percent, preferably below a tenth of a percent, e.g. allowing a maximum water uptake of less than half (mass) percent, preferably below a tenth of a percent, e.g. allowing a maximum water uptake of less than half (mass) percent, preferably below a tenth of a percent. Preferably, the dielectric matrix 3m forms a dense structure after crosslinking. For example, the dielectric matrix 3m comprises a precursor with an acrylate, epoxy, isoprene or benzocyclobutene moiety. For example, the dielectric matrix 3m comprises a dielectric polymer such as polyurethane ether, polyisoprene, cellulose nitrate.

In one embodiment, the substrate comprises or essentially consists of a ceramic, polymer or composite. For example, the substrate comprises a ceramic consisting of a glass ($SiO_2$), silicon, alumina. In another embodiment, the substrate comprises a printed circuit board (PCB), such as a fiber glass reinforced epoxide board FR4, laminate type of PCB. In another embodiment, the substrate comprises plastic such Polystyrene, Polyethylene terephthalate [PET], Polyethylene naphthalate [PEN], Polyimide [PI], Polycarbonate, Poly[methyl methacrylate] [PMMA]. In a preferred embodiment, the substrate comprises a flexible foil, e.g. having a thickness between twenty-five and two hundred micrometers.

A preferred embodiment for manufacturing a temperature sensor, comprises mixing micro-particles in a dielectric matrix with a solvent to form the sensor material as an ink or paste. For example, the paste has a viscosity in a range between 10-100 Pa·s$^{-1}$; In another or further embodiment, the sensor material 3 is applied to a substrate between electrodes of an electrical circuit. In another or further embodiment, the paste is hardened e.g. by crosslinking and/or evaporating the solvent. It will be appreciated that this does not require melting, sintering, or otherwise merging the micro-particles, e.g. forming a single metallurgical network, so the process can be performed at relatively low temperature. Also, it does not require any further metal (sinter) material as binder. Preferably, the sensor and substrate are processed at low temperature e.g. below two hundred and fifty degrees Celsius preferably below hunched-fifty degrees Celsius. For example, the hardening process is performed at an elevated temperature below hundred-fifty degrees Celsius. For example, the melting temperature of the micro-particles (e.g. >500° C. or >1000° C.) can be much higher than the processing temperature (<250° C.).

In one embodiment, an ink is obtained by mixing a 3:1 ratio of metal oxide powder to binder with solvent that is subsequently mixed into a homogenous consistent paste. For example, micro-particles are obtained by mixing base metal oxide powders e.g. MnO, $Co_3O_4$, NiO, CuO, ZnO, etc. into a uniform mixture. These may then be fired e.g. typically around 950° C. for 2 hours. In some embodiments, the metal oxide powder is pressed into pellets and fired again at 1100° C. for 24 hours and cooled down to 950° C. for an hour and then quenched to yield sintered spinel oxide pallets. In other or further embodiments, the pallets are crushed mechanically into smaller pieces and subsequently grinded to a smaller size.

In one embodiment, the particles are sieved through a number of sieves to provide a narrower distribution of particle size. For example, . . . sieving to get size distribution of particles below 10 μm, between 10-20 μm, and above 20 μm. In some embodiments, particles are passivated by submerging the particles in a passivating agent, e.g. a 50 mM isopropanol solution of phosphonic acid.

FIGS. 2A-2D illustrate various details in connection with an optional pacification layer 3s around a core 3c of the micro-particles 3p.

Figure 2A:
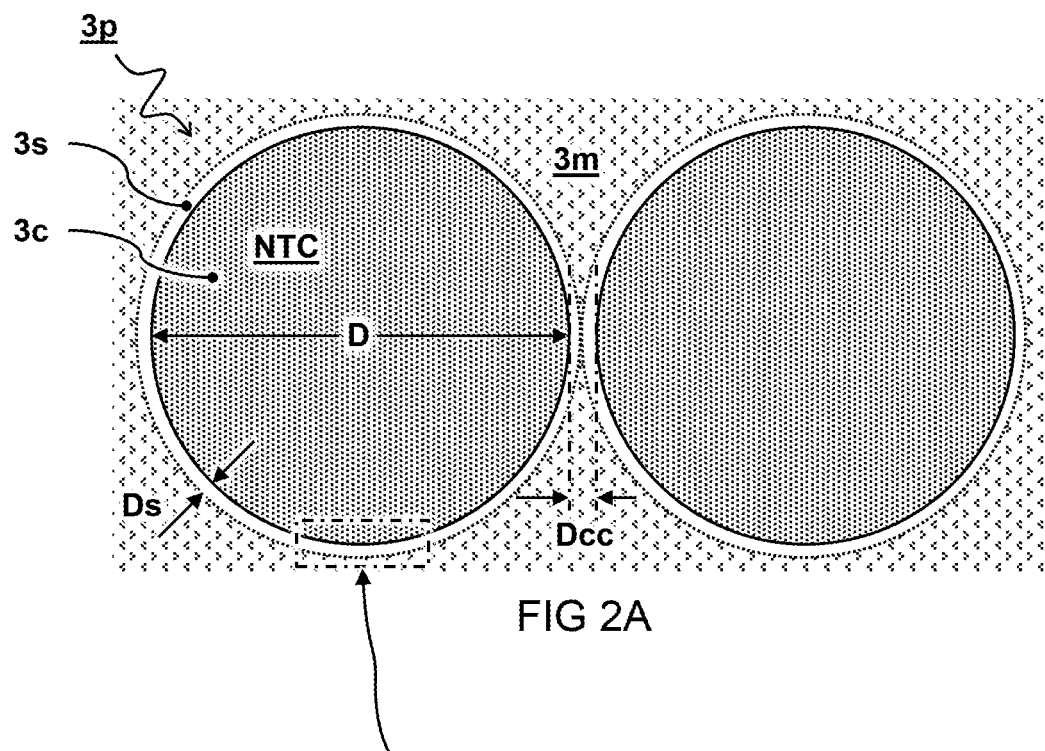
FIGS. 2A-2D illustrate various details in connection with a pacification layer around the micro-particles FIG. 3A schematically illustrates a side view of a second embodiment for a sensor.

FIG. 2A schematically illustrates two contacting micro-particles 3p in a dielectric matrix 3m as described herein. In the embodiment according to the illustration shown, the micro-particles 3p comprise an outer pacification layer 3s, e.g. to make them inert and/or prevent (environmental) degradation. For example, the pacification layer 3s is formed around a core 3c of the micro-particles 3p. Preferably, the core 3c essentially consists of the NTC material.

Figure 2B:
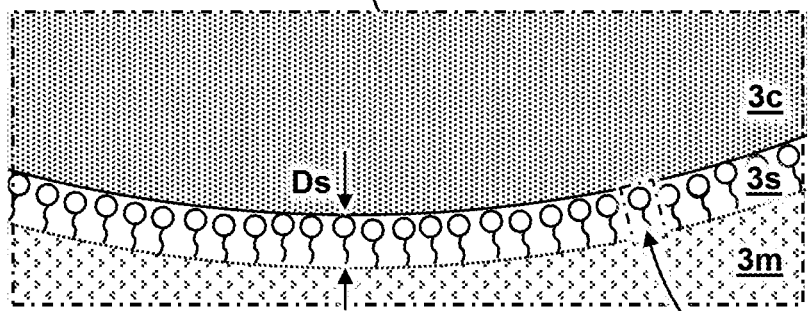

FIG. 2B schematically illustrates a magnified portion of FIG. 2A. In one embodiment, e.g. as illustrated, the pacification layer 3s essentially consists of a single layer of molecules graphed to form an outer surface of the micro-particles 3p. For example, the pacification layer 3s is composed of a self-assembled monolayer graphed to an outer surface of the particle core 3c.

Figure 2C:
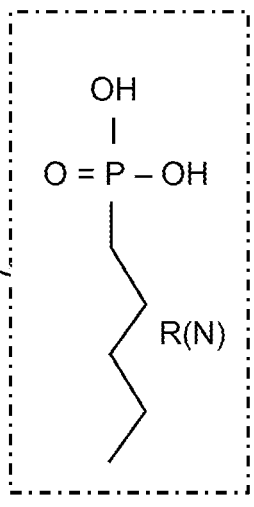

FIG. 2C schematically illustrates a chemical formula of one example molecule for forming the pacification layer 3s. In a preferred embodiment, the self-assembled monolayer consists of a phosphonic acid (phosphorous acid) group and a hydrophobic chain. For example, the hydrophobic chain consists of an aliphatic chain or a fluorinated aliphatic chain. With a carbon atom length between three and eighteen atoms, preferably six to eight atoms long.

Figure 2D:
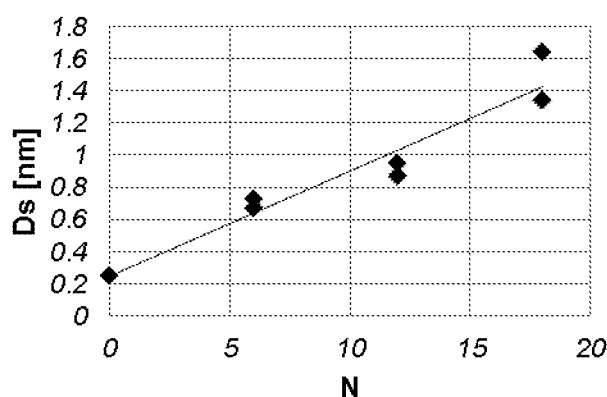

FIG. 2D shows a graph of expected layer thickness Ds of the pacification layer 3s as a function of the number of carbon atoms N in the chain. In a preferred embodiment, the pacification layer thickness Ds is less than five nanometers, more preferably less than two nanometers.

Figure 3A:
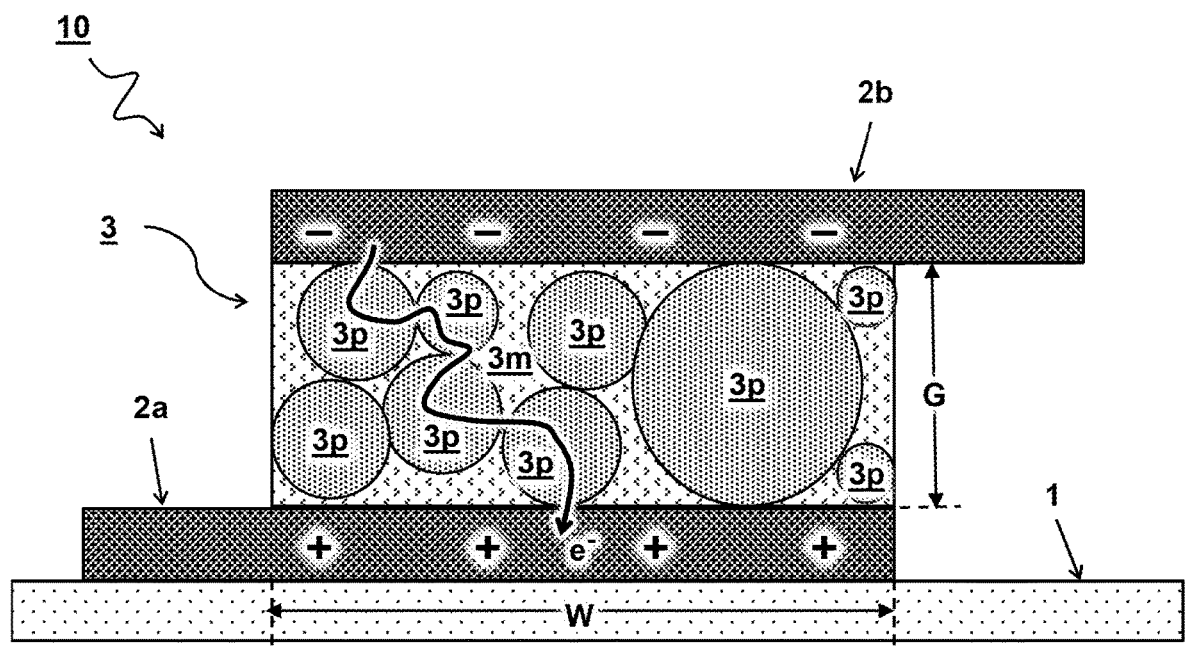
FIG. 3B schematically illustrates a side view of a third embodiment for a sensor.

FIG. 3A schematically illustrates a side view of a second embodiment for a sensor 10. In the embodiment shown, the sensor 10 is formed by a vertical stack on the substrate 1. The stack comprises a layer of sensor material 3 deposited between layers forming a bottom electrode 2a and top electrode 2b. Accordingly, a distance of the electrode gap G may be determined by a layer thickness of the sensor material 3.

Figure 3B:
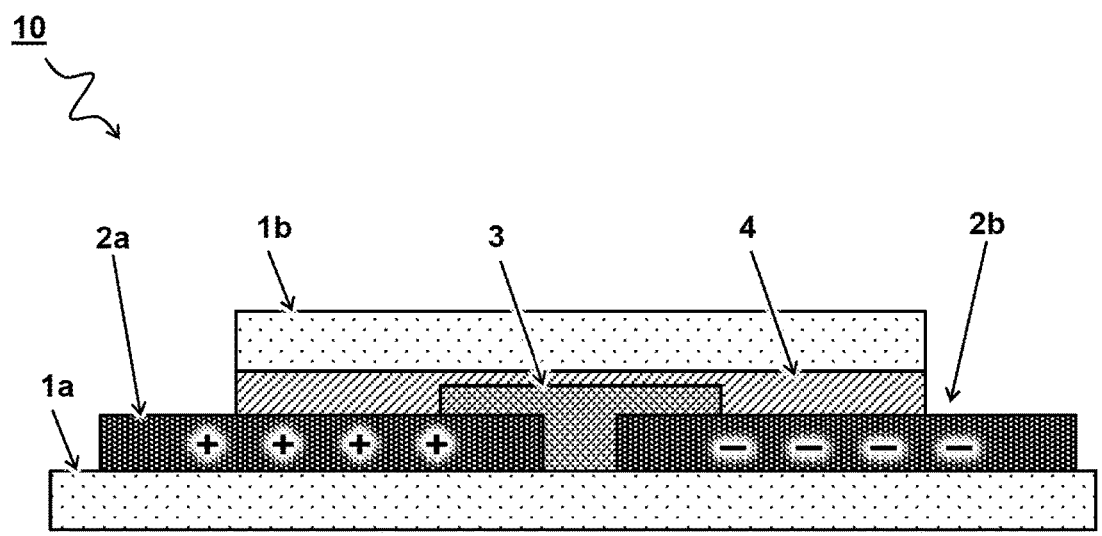

FIG. 3B schematically illustrates a side view of a third embodiment for a sensor 10. In the embodiment shown, the sensor material 3 between the electrodes 2a,2b is encapsulated by an encapsulation layer 4. In one embodiment, the substrate 1 is formed by two parts 1a, 1b on both sides of the sensor material 3.

Figure 4A:
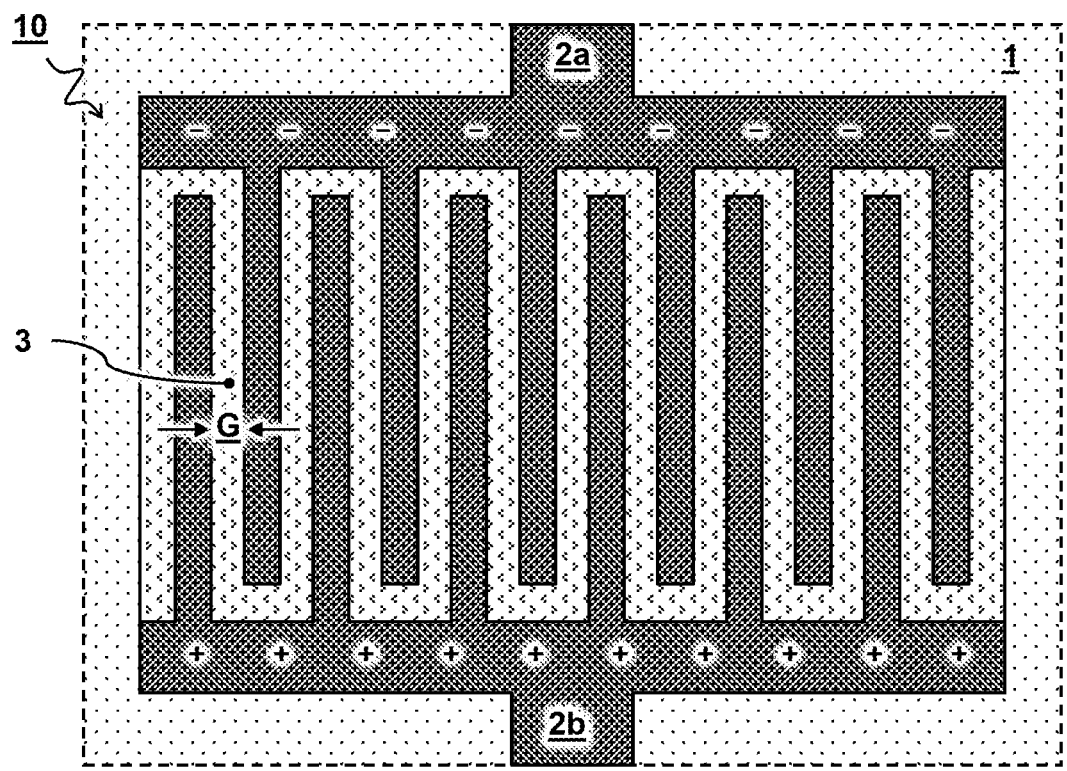
FIG. 4A schematically illustrates a top view of a fourth embodiment for a sensor.

FIG. 4A schematically illustrates a top view of a fourth embodiment for a sensor 10. In the embodiment shown, the electrodes 2a,2b form an intertwined finger structure defining an elongated meandering gap G with sensor material 3 there between. In one embodiment, the elongated gap has a gap length transverse to the electrode surfaces, wherein the gap length is at least ten times a minimum gap distance.

Figure 4B:
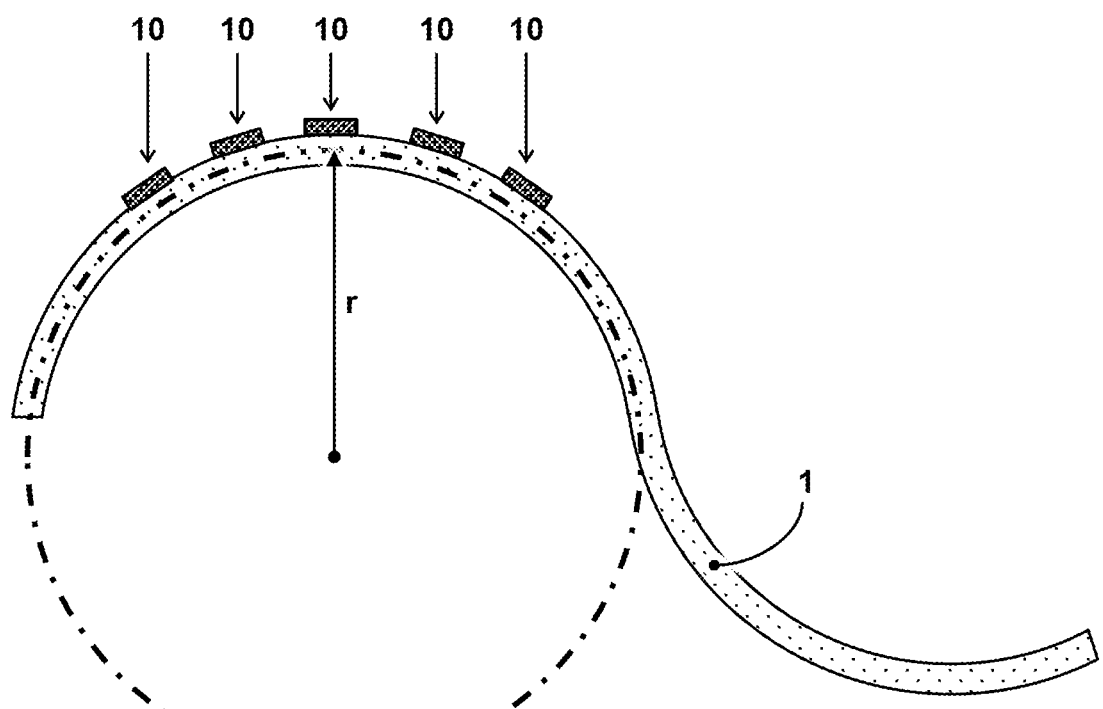
FIG. 4B schematically illustrates a side view of an embodiment for a flexible substrate with sensors.

FIG. 4B schematically illustrates a side view of an embodiment for a flexible substrate 1, in this case with multiple sensors 10. In one embodiment, the substrate 1 with one or more sensors 10 is flexible, e.g. allowing a bending radius "r" of less than five millimeters without (the sensors) losing essential functionality. In another or further embodiment, the substrate 1 with one or more sensors 10 is stretchable, e.g. allowing an elongation of a least ten percent without losing essential functionality. For example, the substrate comprises a rubber substrate, e.g. with polyurethane (TPU) or a silicone. For example, the dielectric matrix 3m comprises a rubber matrix For example, the electrodes comprise stretchable silver paste FIGS. 5A-5D schematically illustrate various circuit diagrams involving one or more sensors 10. One embodiment of a sensor comprises screen printed silver electrodes with in between the temperature sensitive material. The film provides two external leads that may be directly connected to a multimeter or alternatively read out with an ADC using a voltage divider schematic. For example, as shown in FIG. 5A, the temperature dependent resistance Rt of the sensor 10 may result in a corresponding variable output voltage Vout. Alternatively, FIG. 5B illustrates how an opamp may be used for signal amplification and/or reducing noise by providing a high input buffer stage. The sensor is driven by applying a constant voltage Vin in these implementations. Alternatively a constant current source can be used in conjunction with a current to voltage circuit configuration. For example, a voltage ranging between one and five Volt is applied to the sensor. The temperature of the sensors may be extracted from the sensor by using a Steinhart-Hart equation. For example, the parameters may be been extracted for a specific ink composition of the sensor material. Alternatively or in addition, the temperature resistance dependence is calculated e.g. using formulae such as $R=R_0 \exp(\beta/T)$.

FIG. 5C illustrates an example of an array of temperature sensors which may be readout in a method whereby the each sensor is connected in a passive matrix array. For example, one temperature sensor is located at a crossing of each row and column. In one embodiment, cross talk from the other sensors in the array may be suppressed by grounding non selected rows and/or columns.

FIG. 5D illustrates an example wherein an array of temperature sensors is provided wherein each temperature sensors is integrated in series with a thin film transistor. This may allow each sensor to be individually addressed. In one embodiment, a temperature sensitive array is formed by a plurality of sensors 10 on a substrate 1 as described herein.

Figure 6A:
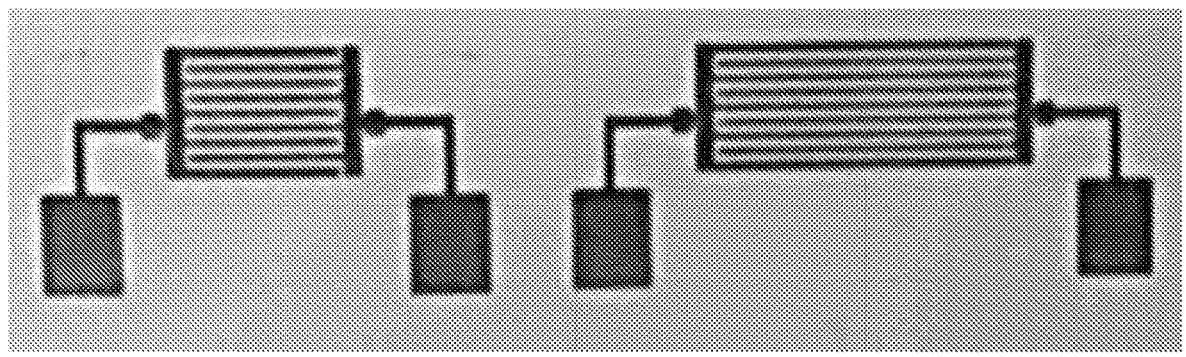
FIG. 6A shows a photograph of two embodiments of sensors comprising intertwined finger structures.

FIG. 6A shows a photograph of two embodiments of sensors comprising intertwined finger structures produced by the methods as described herein. It will be appreciated that the total resistance of the sensor may be varied by varying parameters of the structure such as the number of fingers, the length of the fingers, the size of the gap between the fingers, the thickness of the materials, e.g. sensor layer, et cetera.

Figure 6B:
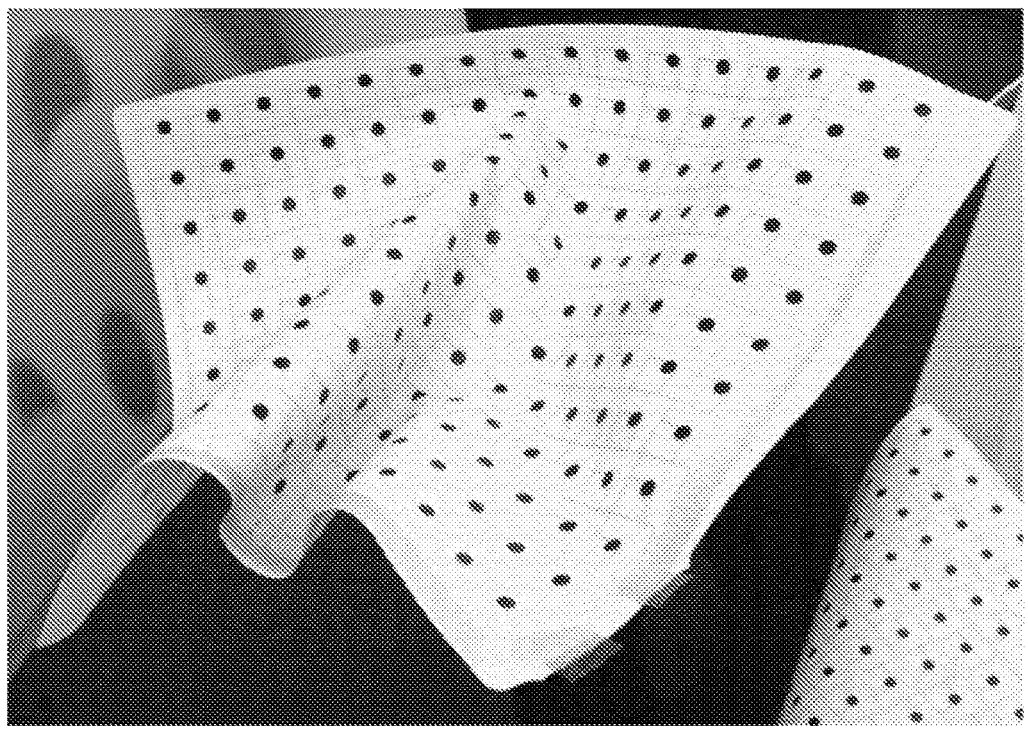
FIG. 6B shows a photograph of a flexible foil comprising a grid of printed temperature sensors.

FIG. 6B shows a photograph of a flexible foil comprising a grid of printed temperature sensors produced by the methods as described herein.

Figure 7A:
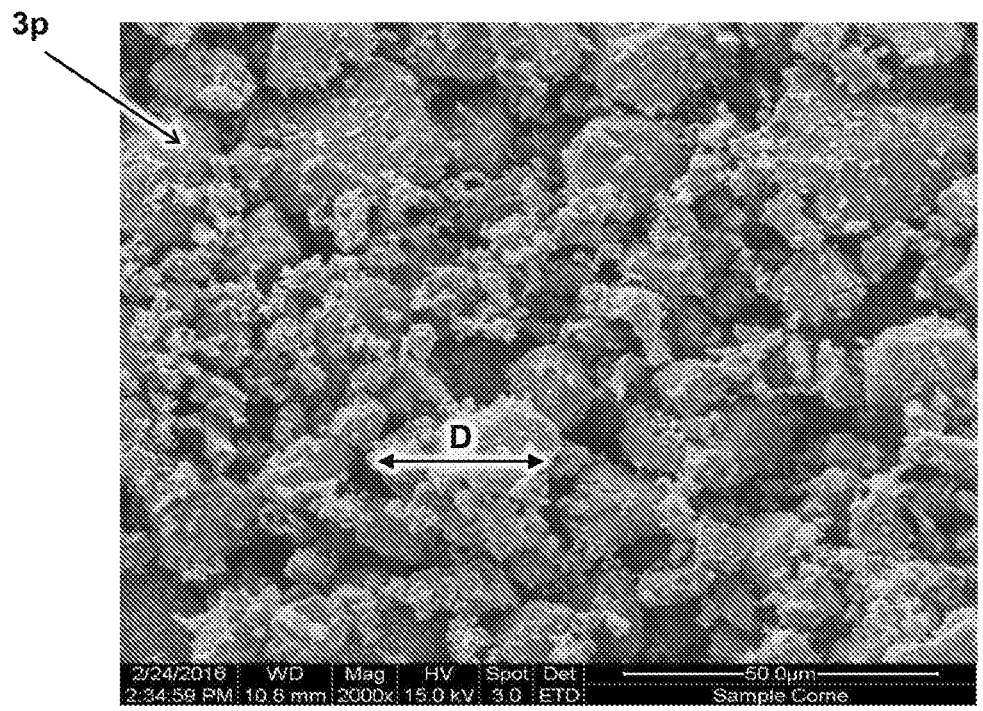
FIG. 7A shows an example electron microscope image of the micro-particles.
Figure 7B:
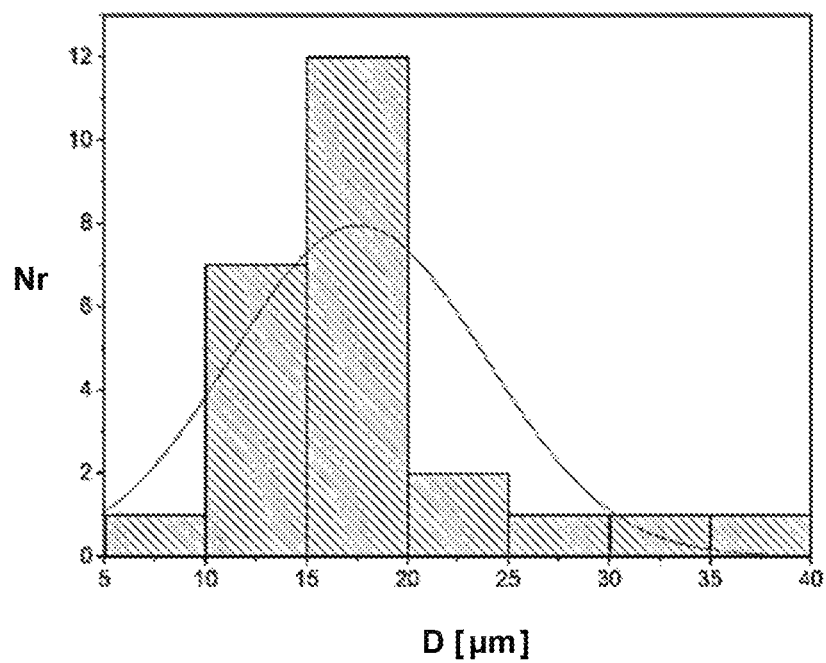
FIG. 7B shows a graph with the measured distribution of particle diameters.

FIG. 7A shows an example electron microscope image of the micro-particles 3p. FIG. 7B shows a graph with the measured distribution of particle diameters D. In a preferred embodiment, the micro-particles 3p comprise a ceramic oxide material. For example, the micro-particles 3p comprise a spinel oxide structure such as $NiMn_2O_4$, $CuFe_2O_4$, $CoMn_2O_4$, $Fe_2O_3$. In an even more preferred embodiment, the micro-particles 3p comprise a manganese spinel oxide ($Mn_2O_3$). Optionally additional oxide of other elements may be included such as Cu, Fe, Co, Ni, Zn. For example a manganese or other spinel oxide may be produced by homogenous distribution of the metal oxide precursor powders that is pressed into a pallet and calcinated, preferably above thousand degrees Celsius, e.g. 1100 degrees Celsius. The calcinated pallets may be grinded and sieved into micro particles of a particular size, e.g. with a size e.g. average or maximum diameter ranging between ten and fifty, preferably between ten and twenty micrometers.

Figure 8A:
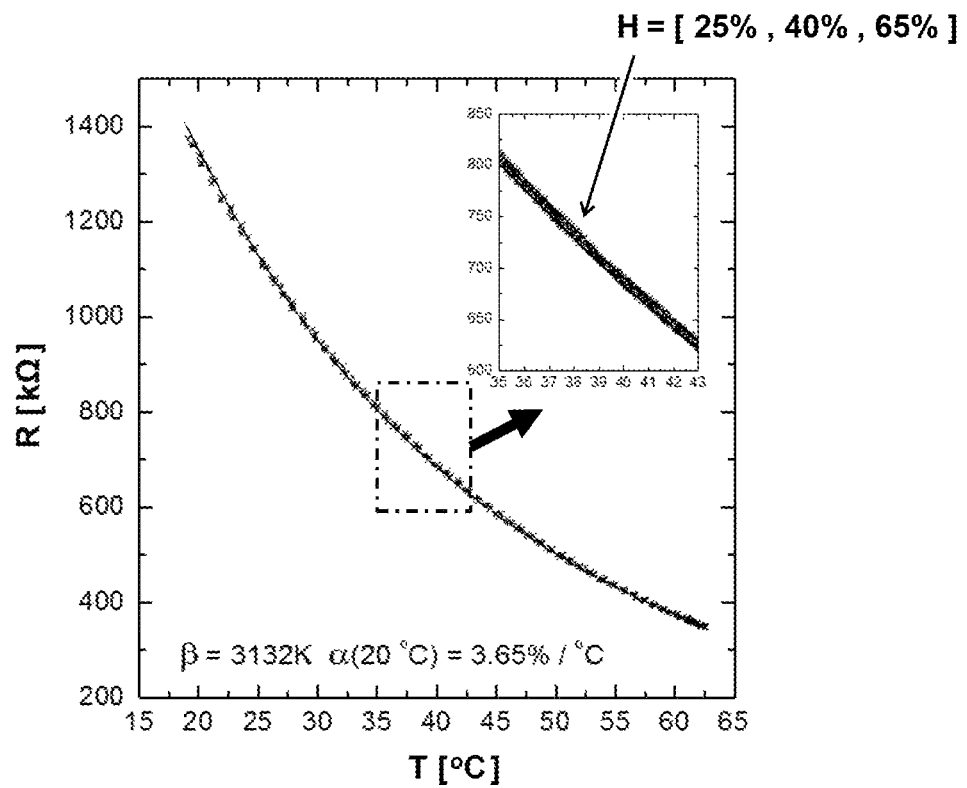
FIGS. 8A and 8B show a graph of measurements for resistance as a function of temperature and/or humidity.

FIG. 8A shows a graph of measurements for resistance R as a function of temperature T for different relative humidifies H of a sensor manufactured according to the methods described herein. The inset shows that the lines for different humidifies are very close demonstrating that the sensor has very low dependence on humidity. In a preferred embodiment, the sensor 10 has a temperature-coefficient ($\alpha$) at room temperature (e.g. 20 degrees Celsius) of more than three percent per Kelvin or a beta ($\beta$) coefficient larger than 2500 Kelvin.

Figure 8B:
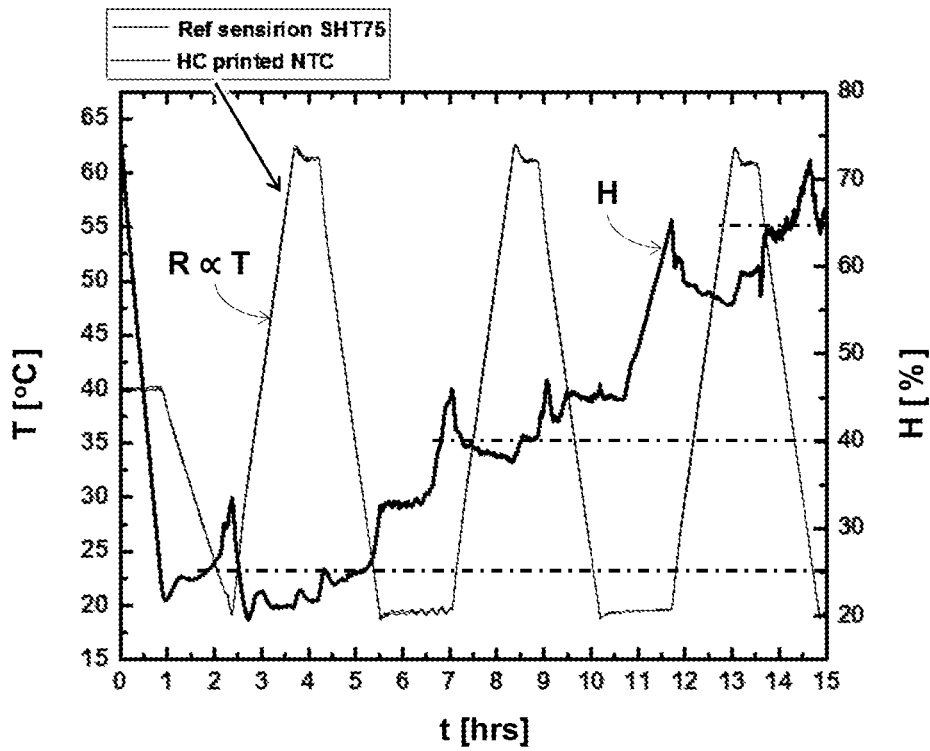

FIG. 8B shows a graph of measurements for a varying temperature with the sensor as described herein and a reference sensor. The lines overlap in the graph so cannot be distinguished in this picture. The graph demonstrates that the sensor is virtually unaffected by relative humidity H and persists after various temperature cycles.

For the purpose of clarity and a concise description, features are described herein as part of the same or separate embodiments, however, it will be appreciated that the scope of the invention may include embodiments having combinations of all or some of the features described. For example, while embodiments were shown for a sensor layouts, also alternative ways may be envisaged by those skilled in the art having the benefit of the present disclosure for achieving a similar function and result. E.g. electronics and/or sensor materials may be combined or split up into one or more alternative components. The various elements of the embodiments as discussed and shown offer certain advantages, such as a printable NTC sensor material. Of course, it is to be appreciated that any one of the above embodiments or processes may be combined with one or more other embodiments or processes to provide even further improvements in finding and matching designs and advantages. In principle, all part of the sensor may be printed or only some parts, e.g. the sensor material, may be printed while other parts, e.g. the electrodes may be deposited or placed by other means. The sensor may completely or partially on a substrate, which substrate may be kept or removed after printing. It is appreciated that this disclosure offers particular advantages to temperature sensors, and in general can be applied for other types of sensor wherein similar sensor material is printed.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A printed temperature sensor comprising:
    an electrical circuit comprising a first electrode and a second electrode, wherein the first electrode and the second electrode are separated by an electrode gap; and
    a sensor material disposed between the first electrode and the second electrode, wherein the sensor material fills the electrode gap,
    wherein the sensor material comprises a semi-conducting micro-particles comprising a negative temperature coefficient (NTC) material,
    wherein the micro-particles are mixed in a dielectric matrix that functions as a binder for printing the sensor material,
    wherein the micro-particles are individual particles that contact each other, without merging, to form an interconnected network through the dielectric matrix,
    wherein the interconnected network of micro-particles acts as a conductive pathway having a negative temperature coefficient between the electrodes such that a resistance of the interconnected network of micro-particles between the first and second electrodes reduces with increases in temperature.

2. The sensor according to claim 1, wherein a volumetric ratio of the micro-particles with respect to the dielectric matrix is above a percolation threshold of the micro-particles to form a connected component throughout the dielectric matrix on the order of a size of the electrode gap.

3. The sensor according to claim 1, wherein a packing density of the micro-particles in the sensor material is more than 0.5.

4. The sensor according to claim 1, wherein a ratio of the micro-particles with respect to the dielectric matrix is sufficiently high to have a conductivity of the sensor material approach within fifty percent of a conductivity of the NTC material.

5. The sensor according to claim 1, wherein a minimum distance of the electrode gap is in a range between one and ten times an average diameter of the micro-particles.

6. The sensor according to claim 1, wherein the micro-particles have a diameter between ten and fifty micrometer.

7. The sensor according to claim 1, wherein the micro-particles comprise a ceramic oxide material with a spinel structure.

8. The sensor according to claim 1 wherein the micro-particles comprise elongate particles with an aspect ratio of more than ten.

9. The sensor according to claim 1, wherein the dielectric matrix comprises an electrically insulating material comprising a polymeric or cross-linkable material.

10. The sensor according to claim 1, wherein the dielectric matrix forms a dense structure after crosslinking, the dense structure allowing a maximum water uptake of less than a half percent.

11. The sensor according to claim 1, further comprising a substrate, wherein the sensor is flexible and/or stretchable.

12. A printed temperature sensor comprising:
    an electrical circuit comprising a first electrode and a second electrode, wherein the first electrode and the second electrode are separated by an electrode gap; and
    a sensor material disposed between the first electrode and the second electrode, wherein the sensor material fills the electrode gap,
    wherein the sensor material comprises a semi-conducting micro-particles comprising a negative temperature coefficient (NTC) material,
    wherein the micro-particles are mixed in a dielectric matrix that functions as a binder for printing the sensor material,
    wherein the micro-particles contact each other to form an interconnected network through the dielectric matrix,
    wherein the interconnected network of micro-particles acts as a conductive pathway having a negative temperature coefficient between the electrodes such that a resistance of the interconnected network of micro-particles between the first and second electrodes reduces with increases in temperature, and
    wherein the micro-particles comprise an outer pacification layer formed around a core of the micro-particles, wherein the core essentially consists of the NTC material and wherein the pacification layer essentially consists of a single layer of molecules graphed to form an outer surface of the micro-particles.

13. The sensor according to claim 12, wherein the micro-particles that form the interconnected network are individual particles contacting each other without merging to form the interconnected network.

14. A method of manufacturing a temperature sensor, the method comprising:
    mixing ceramic micro-particles comprising a negative temperature coefficient (NTC) material, in a dielectric matrix with a solvent to form a sensor material as an ink or paste with a viscosity in a range between 10-100 $Pa \cdot s^{-1}$, wherein the dielectric matrix functions as a binder for printing the sensor material;
    printing the sensor material to a substrate between a first electrode and a second electrode of an electrical circuit;
    processing, after the printing, the sensor material and substrate at a low temperature that is below one hundred fifty degrees Celsius for hardening the sensor material formed as an ink or paste by crosslinking the dielectric matrix and evaporating the solvent without melting or sintering the ceramic micro-particles,
    wherein the ceramic micro-particles remain, after the processing, as individual particles that contact each other, without merging, to form an interconnected network through the dielectric matrix, wherein the interconnected network of ceramic micro-particles acts as a conductive pathway with negative temperature coefficient between the first electrode and the second electrode.

15. The method according to claim 14, wherein the ceramic micro-particles comprise an outer pacification layer formed around a core of the ceramic micro-particles, wherein the core essentially consists of the NTC material and wherein the pacification layer essentially consists of a single layer of molecules graphed to form an outer surface of the ceramic micro-particles.

* * * * *